(12) United States Patent
Ollila

(10) Patent No.: US 12,328,522 B1
(45) Date of Patent: Jun. 10, 2025

(54) SELECTIVE READING AND SKIPPING IN COLOUR FILTER ARRAYS

(71) Applicant: Varjo Technologies Oy, Helsinki (FI)

(72) Inventor: Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 46 days.

(21) Appl. No.: 18/533,393

(22) Filed: Dec. 8, 2023

(51) Int. Cl.
*H04N 25/78* (2023.01)
*H04N 23/611* (2023.01)
*H04N 25/13* (2023.01)

(52) U.S. Cl.
CPC ............ *H04N 25/78* (2023.01); *H04N 23/611* (2023.01); *H04N 25/135* (2023.01)

(58) Field of Classification Search
CPC ..... H04N 25/78; H04N 23/611; H04N 25/135
See application file for complete search history.

(56) References Cited

U.S. PATENT DOCUMENTS

| 11,653,083 | B2 * | 5/2023 | Park | H04N 25/702 |
| | | | | 348/222.1 |
| 2015/0029377 | A1 * | 1/2015 | Yamanaka | H04N 25/133 |
| | | | | 348/311 |
| 2020/0258928 | A1 * | 8/2020 | Seo | H10F 39/8053 |
| 2020/0412983 | A1 * | 12/2020 | Nakata | H04N 7/18 |

* cited by examiner

*Primary Examiner* — Michael E Teitelbaum
(74) *Attorney, Agent, or Firm* — Ziegler IP Group, LLC.

(57) ABSTRACT

An image sensor has photo-sensitive cells arranged on a photo-sensitive surface; and a colour filter array with first type(s) of colour filters, second type(s) of colour filters, third type(s) of colour filters, and fourth type(s) of colour filters. Information indicative of a gaze direction is obtained. A gaze region and a peripheral region in the photo-sensitive surface are determined. Image data from the image sensor is read out, wherein when reading out, processor(s) is/are configured to: selectively skip reading out the image data from those photo-sensitive cells in the gaze region that have the fourth type(s) of colour filters; and selectively read out the image data from those photo-sensitive cells in the peripheral region that have the fourth type(s) of colour filters. The image data is processed to generate an image.

15 Claims, 3 Drawing Sheets

SELECTIVE READING AND SKIPPING IN COLOUR FILTER ARRAYS

TECHNICAL FIELD

The present disclosure relates to imaging systems incorporating selective reading and skipping in colour filter arrays. The present disclosure also relates to methods incorporating selective reading and skipping in colour filter arrays.

BACKGROUND

Nowadays, with an increase in the number of images being captured every day, there is an increased demand for developments in image processing. Such a demand is quite high and critical in case of evolving technologies such as immersive extended-reality (XR) technologies which are being employed in various fields such as entertainment, real estate, training, medical imaging operations, simulators, navigation, and the like. Several advancements are being made to develop image generation technology.

However, existing image generation technology has several limitations associated therewith. Firstly, the existing image generation technology processes image signals captured by pixels of an image sensor of a camera in a manner that such processing requires considerable processing resources, involves a long processing time, requires high computing power, and limits a total number of pixels that can be arranged on an image sensor for full pixel readout at a given frame rate. As an example, image signals corresponding to only about 9 million pixels on the image sensor may be processed currently (by full pixel readout) to generate image frames at 90 frames per second (FPS). Secondly, the existing image generation technology are mostly well-suited for accurately generating a gaze region of an image, and often fails to accurately generate a peripheral region of the image, for example, with a low noise. Resultantly, the peripheral region of the image has very high noise that is prominently noticeable (namely, perceivable) to a user, when said image is displayed to the user. This highly adversely affects an overall visual quality of generated images, thereby leading to an unrealistic, non-immersive viewing experience for the user. Thirdly, the existing image processing technology is unable to cope with visual quality requirements, for example, such as a high resolution (such as a resolution higher than or equal to 60 pixels per degree), a small pixel size, and a high frame rate (such as a frame rate higher than or equal to 90 FPS) in some display devices (such as XR devices).

Therefore, in light of the foregoing discussion, there exists a need to overcome the aforementioned drawbacks.

SUMMARY

The present disclosure seeks to provide an imaging system and a method to generate high-quality, realistic images at a high framerate, by processing image data that is read out by selectively skipping read out of image data from a gaze region of an image sensor and by selectively reading out image data from a peripheral region of the image sensor. The aim of the present disclosure is achieved by an imaging system and a method which incorporate selective reading and skipping in colour filter arrays, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIG. 3A illustrates different regions of a photo-sensitive surface of an image sensor, while

DETAILED DESCRIPTION OF EMBODIMENTS

Figure 1:
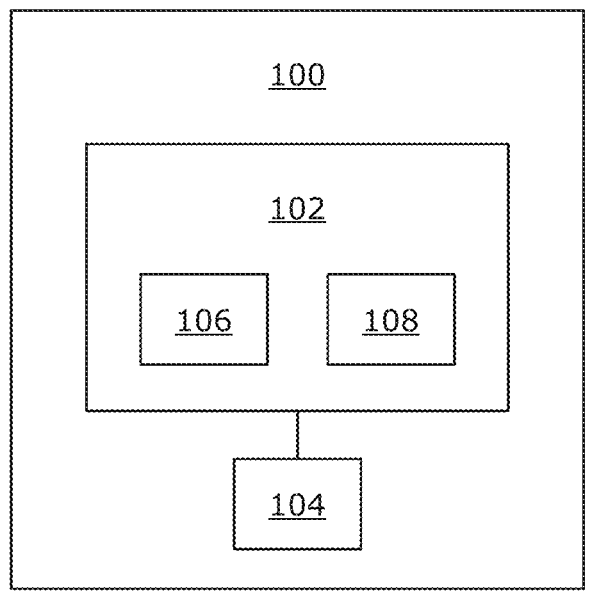
FIG. 1 illustrates a block diagram of an architecture of an imaging system incorporating selective reading and skipping in colour filter arrays, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides an imaging system comprising:
 an image sensor comprising:
  a plurality of photo-sensitive cells arranged on a photo-sensitive surface of the image sensor; and
  a colour filter array comprising:
   at least one first type of colour filters that allow at least one first wavelength lying in a first wavelength range to pass through,
   at least one second type of colour filters that allow at least one second wavelength lying in a second wavelength range to pass through,
   at least one third type of colour filters that allow at least one third wavelength lying in a third wavelength range to pass through, and
   at least one fourth type of colour filters that allow the at least one first wavelength, the at least one second wavelength and the at least one third wavelength to pass through; and
 at least one processor configured to:
  obtain information indicative of a gaze direction of a user;
  determine a gaze region and a peripheral region in the photo-sensitive surface of the image sensor, based on the gaze direction;

read out image data from the image sensor, wherein when reading out, the at least one processor is configured to:
  selectively skip reading out the image data from those photo-sensitive cells in the gaze region that have the at least one fourth type of colour filters; and
  selectively read out the image data from those photo-sensitive cells in the peripheral region that have the at least one fourth type of colour filters; and
process the image data to generate an image.

In a second aspect, an embodiment of the present disclosure provides a method comprising:
  obtaining information indicative of a gaze direction of a user;
  determining a gaze region and a peripheral region in a photo-sensitive surface of an image sensor, based on the gaze direction, wherein the image sensor comprises a plurality of photo-sensitive cells arranged on the photo-sensitive surface of the image sensor, and a colour filter array comprising: at least one first type of colour filters that allow at least one first wavelength lying in a first wavelength range to pass through, at least one second type of colour filters that allow at least one second wavelength lying in a second wavelength range to pass through, at least one third type of colour filters that allow at least one third wavelength lying in a third wavelength range to pass through, and at least one fourth type of colour filters that allow the at least one first wavelength, the at least one second wavelength and the at least one third wavelength to pass through;
  reading out image data from the image sensor, wherein the step of reading out the image data comprises:
    selectively skip reading out the image data from those photo-sensitive cells in the gaze region that have the at least one fourth type of colour filters; and
    selectively reading out the image data from those photo-sensitive cells in the peripheral region that have the at least one fourth type of colour filters; and
  processing the image data to generate an image.

The present disclosure provides the aforementioned imaging system and method to generate high-quality, realistic images at a high framerate, by processing image data that is read out by selectively skipping read out of image data from a gaze region of an image sensor and by selectively reading out image data from a peripheral region of the image sensor. Herein, upon determining the gaze region and the peripheral region in the photo-sensitive surface of the image sensor, the image data is read out in a manner that those photo-sensitive cells in the gaze region that have the at least one fourth type of colour filters are skipped, and those photo-sensitive cells in the peripheral region that have the at least one fourth type of colour filters are read. Beneficially, this enables in achieving a high visual quality (for example, in terms of a native resolution, a high contrast, a realistic and accurate colour reproduction, and the like) in corresponding gaze-contingent pixels of the image (that is generated upon processing the image data), as well as in achieving a low noise in corresponding non-gaze-contingent pixels of said image. This considerably improves a viewing experience of the user (for example, in terms of realism and immersiveness), when said image is displayed to the user. Moreover, such a selective read out facilitates in providing a high frame rate of images, and reduces a processing time and processing resources of the at least one processor. This potentially makes the imaging system suitable for use with demanding applications (such as extended-reality applications). The method and the imaging system are simple, robust, fast, reliable, and can be implemented with ease.

Throughout the present disclosure, the term "image sensor" refers to a device that detects light from a real-world environment at the plurality of photo-sensitive cells (namely, a plurality of pixels) to capture a plurality of image signals. The plurality of image signals are electrical signals pertaining to a real-world scene of the real-world environment. The plurality of image signals constitute the image data of the plurality of photo-sensitive cells. Herein, the term "image data" refers to information pertaining to a given photo-sensitive cell of the image sensor, wherein said information comprises one or more of: a colour value of the given photo-sensitive cell, a depth value of the given photo-sensitive cell, a transparency value of the given photo-sensitive cell, a luminosity value of the given photo-sensitive cell. The colour value could, for example, be Red-Green-Blue (RGB) values, Red-Green-Blue-Alpha (RGB-A) values, Cyan-Magenta-Yellow-Black (CMYK) values, Red-Green-Blue-Depth (RGB-D) values, or similar. Examples of the image sensor include, but are not limited to, a charge-coupled device (CCD) image sensor, and a complementary metal-oxide-semiconductor (CMOS) image sensor.

Image sensors are well-known in the art. It will be appreciated that the plurality of photo-sensitive cells could, for example, be arranged in a rectangular two-dimensional (2D) grid, a polygonal arrangement, a circular arrangement, an elliptical arrangement, a freeform arrangement, or the like, on the image sensor. In an example, the image sensor may comprise 25 megapixels arranged in the rectangular 2D grid (such as a 5000×5000 grid) on the photo-sensitive surface.

Optionally, the image sensor is a part of a camera that is employed to capture image(s). Optionally, the camera is implemented as a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. It will be appreciated that in an RYYB-camera implementation, one of the yellow colour filters could be replaced by a wide-range yellow colour filter (i.e., a yellow colour filter having a wider range of wavelengths as compared to a standard/normal yellow colour filter). Similarly, in an RGGB-camera implementation, one of the green colour filters could be replaced by a wide-range green colour filter (i.e., a green colour filter having a wider range of wavelengths as compared to a standard/normal green colour filter). Due to this, the aforesaid wide-range colour filters would receive a broader spectrum of light, as compared to a standard colour filter, which potentially facilitates in improving image quality or colour accuracy. The aforesaid implementations could be served as alternatives to an RGBW-camera implementation. Additionally, optionally, the camera is implemented as a depth camera. Examples of the depth camera include, but are not limited to, a Time-of-Flight (ToF) camera, a light detection and ranging (LiDAR) camera, a Red-Green-Blue-Depth (RGB-D) camera, a laser rangefinder, a stereo camera, a plenoptic camera, an infrared (IR) camera, a ranging camera, a Sound Navigation and Ranging (SONAR) camera. Optionally, the camera is implemented as a combination of the visible-light camera and the depth camera.

Throughout the present disclosure, the term "colour filter array" refers to a pattern of colour filters arranged in front of the plurality of photo-sensitive cells of the photo-sensitive surface, wherein the colour filter array (CFA) allows only specific wavelengths of light to pass through a given colour filter to reach a corresponding photo-sensitive cell of the photo-sensitive surface, for capturing corresponding image data. The CFA could be a Bayer CFA, a non-Bayer CFA, or similar. The CFA is well-known in the art.

Notably, there are at least four different types of colour filters in the CFA, as discussed earlier. In an example, for a Red-Green-Blue-White (RGBW)-based implementation, the at least one first type of colour filters may be a green-type of colour filters, the at least one second type of colour filters may be a red-type of colour filters, the at least one third type of colour filters may be a blue-type of colour filters, and the at least one fourth type of colour filters may be a white-type of colour filters. In this regard, the first wavelength range (that corresponds to the green-type of colour filters) may be from 480 nanometres (nm) to 580 nm, the second wavelength range (that corresponds to the red-type of colour filters) may be from 580 nm to 700 nm, the third wavelength range (that corresponds to the blue-type of colour filters) may be from 400 nm to 480 nm. It is to be understood that the at least one fourth type of colour filters defines a white or near white filter, which allows most of the wavelengths lying in a wavelength range of 400 nm to 700 nm. The aforesaid wavelength ranges may also overlap with each other.

In another example, for a Cyan-Magenta-Yellow-White (CMYW)-based implementation, the at least one first type of colour filters may be a cyan-type of colour filters, the at least one second type of colour filters may be a magenta-type of colour filters, the at least one third type of colour filters may be a yellow-type of colour filters, and the at least one fourth type of colour filters may be a white-type of colour filters. In this regard, the first wavelength range (that corresponds to the cyan-type of colour filters) may be from 490 nm to 520 nm, the second wavelength range (that corresponds to the magenta-type of colour filters) may be from 600 nm to 660 nm, the third wavelength range (that corresponds to the yellow-type of colour filters) may be from 570 nm to 590 nm. It is to be understood that the at least one fourth type of colour filters defines a white or near white filter, which allows most of the wavelengths lying in a wavelength range of 490 nm to 660 nm. The aforesaid wavelength ranges may also overlap with each other.

It will be appreciated that the phrase "at least one given type of colour filters" encompasses a single colour filter of a given colour and/or a plurality of colour filters having different shades of a given colour. For example, in case of a plurality of blue-types of colour filters, there could be different shades of a blue colour in different blue-types of colour filters. Likewise, in case of a plurality of green-types of colour filters, there could be different shades of a green colour in different green-types of colour filters. Moreover, the at least one fourth type of colour filters defines a white or near white filter, which allows most of the wavelengths lying in a wavelength range of 400 nanometres to 700 nanometres to pass through. It will also be appreciated that the at least one fourth type of colour filters allows passing of the at least one first wavelength, the at least one second wavelength and the at least one third wavelength therethrough simultaneously. Typically, a multicolour filter comprises several narrow colour filters. However, such a filter is not widely used and one of the challenges with such a multicolour filter is a process of converting image data (captured using said filter) into a high-quality RGB image.

Optionally, the at least one processor is configured to obtain, from a client device, the information indicative of the gaze direction. The client device could be implemented, for example, as a head-mounted display (HMD) device. Optionally, the client device comprises gaze-tracking means. The term "gaze direction" refers to a direction in which a given eye of the user is gazing. Such a gaze direction may be a gaze direction of a single user of a client device, or be an average gaze direction for multiple users of different client devices. The gaze direction may be represented by a gaze vector. Furthermore, the term "gaze-tracking means" refers to specialized equipment for detecting and/or following gaze of user's eyes. The gaze-tracking means could be implemented as contact lenses with sensors, cameras monitoring a position, a size and/or a shape of a pupil of the user's eye, and the like. The gaze-tracking means are well-known in the art. The term "head-mounted display" device refers to specialized equipment that is configured to present an extended-reality (XR) environment to a user when said HMD device, in operation, is worn by the user on his/her head. The HMD device is implemented, for example, as an XR headset, a pair of XR glasses, and the like, that is operable to display a visual scene of the XR environment to the user. The term "extended-reality" encompasses augmented reality (AR), mixed reality (MR), and the like. It will be appreciated that when the imaging system is remotely located from the client device, the at least one processor obtains the information indicative of the gaze direction from the client device. Alternatively, when the imaging system is integrated into the client device, the at least one processor obtains the information indicative of the gaze direction from the gaze-tracking means of the client device.

Optionally, the gaze direction is a current gaze direction. Alternatively, optionally, the gaze direction is a predicted gaze direction. It will be appreciated that optionally the predicted gaze direction is predicted, based on a change in user's gaze, wherein the predicted gaze direction lies along a direction of the change in the user's gaze. In such a case, the change in the user's gaze could be determined in terms of a gaze velocity and/or a gaze acceleration of the given eye, using information indicative of previous gaze directions of the given eye and/or the current gaze direction of the given eye. Yet alternatively, optionally, the gaze direction is a default gaze direction, wherein the default gaze direction is straight towards a centre of a field of view of the image sensor. In this regard, it is considered that the gaze of the user's eye is, by default, typically directed towards a centre of his/her field of view. In such a case, a central region of a field of view of the user is resolved to a much greater degree of visual detail, as compared to a remaining, peripheral region of the field of view of the user. It is to be understood that a gaze position corresponding to the default gaze direction lies at a centre of the photosensitive surface.

Optionally, when determining the gaze region and the peripheral region in the photo-sensitive surface, the at least one processor is configured to map the gaze direction of the given eye onto the photo-sensitive surface. The term "gaze region" refers to a region in the photo-sensitive surface onto which the gaze direction is mapped. The gaze region may, for example, be a central region of the photo-sensitive surface, a top-left region of the photo-sensitive surface, a bottom-right region of the photo-sensitive surface, or similar. The term "peripheral region" refers to another region in the photo-sensitive surface that surrounds the gaze region.

The another region may, for example, remain after excluding the gaze region from the photo-sensitive surface.

It will be appreciated that the gaze region and the peripheral region are optionally selected dynamically, based on the gaze direction. In this regard, the gaze region corresponds to a gaze area (i.e., a region of interest), whereas the peripheral region corresponds to a peripheral area surrounding the gaze area. Such a dynamic manner of selecting the gaze region and the peripheral region emulates a way in which the user actively focuses within his/her field of view. Optionally, an angular width of the peripheral region lies in a range of 12.5-50 degrees from a gaze position to 45-110 degrees from the gaze position, while an angular extent of the gaze region lies in a range of 0 degree from the gaze position to 2-50 degrees from the gaze position, wherein the gaze position is a position on the photo-sensitive surface onto which the gaze direction is mapped. Determining the gaze region and the peripheral region in the photo-sensitive surface is well-known in the art. Optionally, the at least one processor is further configured to determine an intermediate region in the photo-sensitive surface, based on the gaze direction, wherein the intermediate region lies in between the gaze region and the peripheral region in the photo-sensitive surface. Optionally, a width of the intermediate region lies in a range of 1 pixel to 300 pixels.

Notably, the image data is read out by the at least one processor from the image sensor. In particular, the at least one processor does not read out (namely, skips reading out) those photo-sensitive cells in the gaze region that have the at least one fourth type of colour filters (for example, photo-sensitive cells having white or near-white colour filters are skipped in the gaze region), but instead reads out and processes only those photo-sensitive cells in the gaze region that have one of: the at least one first type of colour filters, the at least one second type of colour filters, the at least one third type of colour. Beneficially, a processing time for selectively reading out the image data from the gaze region is considerably lesser, as compared to a processing time for reading out the image data from each photo-sensitive cell in the gaze region. In addition to this, even reading out only those photo-sensitive cells in the gaze region that have one of: the at least one first type of colour filters, the at least one second type of colour filters, the at least one third type of colour filters, enables in achieving a high visual quality (for example, in terms of a native resolution, a high contrast, a realistic and accurate colour reproduction, and the like) in corresponding gaze-contingent pixels of the image (that is generated upon processing the image data). In addition to this, such a selective read out of the image data in the gaze region facilitates in providing a high frame rate of images. This has been also illustrated in conjunction with FIG. 3B, for sake of better understanding and clarity.

It is to be understood that selectively skipping read out of the image data from those photo-sensitive cells in the gaze region that have the at least one fourth type of colour filters does not necessarily mean that the image data from all remaining photo-sensitive cells in the gaze region that have the respective ones of: the at least one first type of colour filters, the at least one second type of colour filters and the at least one third type of colour filters, is read out. Moreover, skipping reading out of the image data from photo-sensitive cells in the gaze region does not necessarily mean that reading out of the image data is fully (i.e., 100 percent) skipped for said photo-sensitive cells. Thus, even when said skipping is performed only for a predefined percent (such as 99 percent or 95 percent) of the photo-sensitive cells in the gaze region, it should be considered as almost full skipping. Optionally, when the plurality of photo-sensitive cells are arranged in the rectangular 2D grid on the photo-sensitive surface, the image data is read out in a line-by-line manner.

It will be appreciated that an extent of performing sub-sampling could vary in the gaze region and the peripheral region. For example, in some implementations, 25 percent subsampling could be performed in the gaze region i.e., for every four photo-sensitive cells, image data from only one photo-sensitive cell can be read out (for example, such as when the gaze region is significantly large). Moreover, in this example, 75 percent subsampling could be performed in the peripheral region i.e., for every four photo-sensitive cells, image data from three photo-sensitive cells can be read out. Thus, this may potentially facilitate in achieving a high frame rate of generating images.

Further, the at least one processor reads out (at least) those photo-sensitive cells in the peripheral region that have the at least one fourth type of colour filters (for example, photo-sensitive cells having white or near-white colour filters are read out in the peripheral region). Additionally, optionally, the at least one processor is further configured to read out the image data from those photo-sensitive cells in the peripheral region that have one of: the at least one first type of colour filters, the at least one second type of colour filters, the at least one third type of colour filters. However, this does not necessarily mean that the image data from all the photo-sensitive cells that have respective ones of: the at least one first type of colour filters, the at least one second type of colour filters, and the at least one third type of colour filters in the peripheral region is read out. In other words, it may be possible that the image data from only some photo-sensitive cells that have respective ones of: the at least one first type of colour filters, the at least one second type of colour filters, and the at least one third type of colour filters would be read out (and processed subsequently), while the image data from such other remaining photo-sensitive cells would not be read out. Beneficially, a processing time for selectively reading out the image data from the peripheral region is considerably lesser, as compared to a processing time for reading out the image data from each photo-sensitive cell in the peripheral region. In addition to this, reading out at least those photo-sensitive cells in the peripheral region that have the at least one fourth type of colour filters enables in achieving a low noise in corresponding non-gaze-contingent pixels of the image (that is generated upon processing the image data). This considerably improves a viewing experience of the user (for example, in terms of realism and immersiveness), when said image is displayed to the user, as a peripheral region of said image would be generated with minimal noise that would be imperceptible to the user. This is because presence of white or near-white colour filters allows to reduce the noise, as a white pixel receives all the light (without filtering out any particular colour). Moreover, a selective read out of the image data in the peripheral region may facilitate in providing a high frame rate of images. This has been also illustrated in conjunction with FIG. 3C, for sake of better understanding and clarity.

It will be appreciated that there may be an instance when a difference between a visual quality of a gaze region of the image and a visual quality of a peripheral region of the image is considerably drastic (namely, too abrupt). Thus, in such instances, a transition (namely, a boundary) between the two aforesaid regions of the image may be clearly recognizable (namely, perceivable) by the user when said image is displayed to the user, and a viewing experience of the user would be compromised. Therefore, in order to circumvent this potential problem, the intermediate region is optionally determined (as discussed earlier), and reading out of the image data in said intermediate region could be a mix of both how the image data is read out from the gaze region and how the image data is read out the peripheral region.

Upon reading out the image data from the gaze region and the peripheral region, said image data is processed to generate the image. Optionally, when processing the image data, the at least one processor is configured to perform demosaicking and optionally, other image signal processing (ISP) on the image data (for example, in an ISP pipeline) to generate the image. It will be appreciated that the at least one processor is configured to employ at least one image processing algorithm for performing the demosaicking. In this regard, the at least one image processing algorithm is a modified version of image processing algorithms that are well-known in the art for performing the demosaicking. The at least one image processing algorithm may also comprise at least one of: an image denoising algorithm, an interpolation algorithm, an image sharpening algorithm, a colour conversion algorithm, an auto white balancing algorithm, a deblurring algorithm, a contrast enhancement algorithm, a low-light enhancement algorithm, a tone mapping algorithm, a super-resolution algorithm, an image compression algorithm. Techniques for processing the image data for generating images are well-known in the art.

In an embodiment, the at least one processor is configured to:
  determine a peripheral region in at least one previous image that corresponds to the peripheral region in the photo-sensitive surface;
  determine whether at least one image segment in the peripheral region in the at least one previous image has a colour whose wavelength lies in one of: the first wavelength range, the second wavelength range, the third wavelength range; and
  when it is determined that at least one image segment in the peripheral region in the at least one previous image has a colour whose wavelength lies in one of: the first wavelength range, the second wavelength range, the third wavelength range, identify a part of the peripheral region in the photo-sensitive surface that corresponds to the at least one image segment in the peripheral region in the at least one previous image,
wherein when reading out, the at least one processor is configured to selectively read out the image data from those photo-sensitive cells in said part of the peripheral region that have one of: the at least one first type of colour filters, the at least one second type of colour filters, the at least one third type of colour filters, which corresponds to said one of: the first wavelength range, the second wavelength range, the third wavelength range, in which the wavelength of said colour lies.

In this regard, when the at least one image segment of the at least one previous image has the colour whose wavelength lies in one of: the first wavelength range, the second wavelength range, the third wavelength range, it may be likely that at least one corresponding image segment in a peripheral region of a subsequent image for which the image data is to be read out, also has the same colour. This may be because when a frame rate is high (such as in a case of using an XR device) and the real-world environment is considerably static, there would not be any significant variation of colours in consecutives images. Therefore, the image data from said photo-sensitive cells in said part of the peripheral region in the photo-sensitive surface that corresponds to the at least one image segment is read out, in addition to the image data from those photo-sensitive cells in the peripheral region that have the at least one fourth type of colour filters. This is because since a same colour is prominent in the at least one image segment of the at least one previous image, it would be beneficial (when reading out the image data in the peripheral region for the subsequent image) to read out only those photo-sensitive cells in said part of the peripheral region that have one of: the at least one first type of colour filters, the at least one second type of colour filters, the at least one third type of colour filters, in which the wavelength of said colour lies. This potentially facilitates in saving processing resources and processing time of the at least one processor, as well as reduces an overall read out time of the image data. This has been also illustrated in conjunction with FIG. 3C, for sake of better understanding and clarity.

Optionally, when determining the peripheral region in the at least one previous image, the at least one processor is configured to reproject the at least one previous image from a previous pose of the image sensor to a new pose of the image sensor from which the image data is being read out. The term "pose" encompasses a viewing position and/or a viewing direction of the image sensor. Image reprojection techniques are well-known in the art. Further, optionally, when determining whether the at least one image segment in the peripheral region has the colour whose wavelength lies in one of: the first wavelength range, the second wavelength range, the third wavelength range, the at least one processor is configured to utilise colour information (for example, such as colour values of pixels) in the at least one previous image in a pixel-by-pixel manner. It is to be understood that a correlation between the colour information and a corresponding wavelength range is pre-known to the at least one processor, for example, from a look-up table. Optionally, when identifying the part of the peripheral region in the photo-sensitive surface, the at least one processor is configured to map a field of view of the at least one image segment in the peripheral region in the at least one previous image onto the photo-sensitive surface.

In an embodiment, when reading out, the at least one processor is configured to selectively read out the image data from photo-sensitive cells in the gaze region that have respective ones of: the at least one first type of colour filters, the at least one second type of colour filters and the at least one third type of colour filters. In this regard, except the image data for those photo-sensitive cells in the gaze region that have the at least one fourth type of colour filters, the at least one processor reads out the image data from the photo-sensitive cells in the gaze region that have the respective ones of: the at least one first type of colour filters, the at least one second type of colour filters, and the at least one third type of colour filters. Thus, image data from all such photo-sensitive cells is processed to generate a gaze region in the image. Beneficially, such a read out facilitates in achieving a high visual quality (for example, in terms of a native resolution, realistic and accurate colour reproduction, and the like) in corresponding gaze-contingent pixels of the gaze region in the image (that is generated upon processing the image data).

In another embodiment, the at least one processor is configured to:
  determine a gaze region in at least one previous image that corresponds to the gaze region in the photo-sensitive surface;
  determine whether at least one image segment in the gaze region in the at least one previous image has a colour whose wavelength lies in one of: the first wavelength range, the second wavelength range, the third wavelength range; and when it is determined that at least one image segment in the gaze region in the at least one previous image has a colour whose wavelength lies in one of: the first wavelength range, the second wavelength range, the third wavelength range, identify a part of the gaze region in the photo-sensitive surface that corresponds to the at least one image segment in the gaze region in the at least one previous image, wherein when reading out, the at least one processor is configured to selectively read out the image data from those photo-sensitive cells in said part of the gaze region that have one of: the at least one first type of colour filters, the at least one second type of colour filters, the at least one third type of colour filters, which corresponds to said one of: the first wavelength range, the second wavelength range, the third wavelength range, in which the wavelength of said colour lies.

In this regard, when the at least one image segment of the at least one previous image has the colour whose wavelength lies in one of: the first wavelength range, the second wavelength range, the third wavelength range, it may be likely that at least one corresponding image segment in a gaze region of a subsequent image for which the image data is to be read out, also has the same colour. Therefore, the image data from said photo-sensitive cells in said part of the gaze region in the photo-sensitive surface that corresponds to the at least one image segment is read out. This is because since a same colour is prominent in the at least one image segment of the at least one previous image, it would be beneficial (when reading out the image data in the gaze region for the subsequent image) to read out only those photo-sensitive cells in said part of the gaze region that have one of: the at least one first type of colour filters, the at least one second type of colour filters, the at least one third type of colour filters, in which the wavelength of said colour lies. This potentially facilitates in saving processing resources and processing time of the at least one processor, as well as reduces an overall read out time of the image data. This has been also illustrated in conjunction with FIG. 3B, for sake of better understanding and clarity.

Optionally, when determining the gaze region in the at least one previous image, the at least one processor is configured to reproject the at least one previous image from a previous pose of the image sensor to a new pose of the image sensor from which the image data is being read out. Further, optionally, when determining whether the at least one image segment in the gaze region has the colour whose wavelength lies in one of: the first wavelength range, the second wavelength range, the third wavelength range, the at least one processor is configured to utilise colour information (for example, such as colour values of pixels) in the at least one previous image in a pixel-by-pixel manner. It is to be understood that a correlation between the colour information and a corresponding wavelength range is pre-known to the at least one processor, for example, from a look-up table. Optionally, when identifying the part of the gaze region in the photo-sensitive surface, the at least one processor is configured to map a field of view of the at least one image segment in the gaze region in the at least one previous image onto the photo-sensitive surface.

Optionally, when reading out, the at least one processor is configured to bin at least two photo-sensitive cells having respective ones of at least two different types of colour filters in the peripheral region. In this regard, when reading out the image data from the peripheral region in the photo-sensitive surface, the at least two photo-sensitive cells (corresponding to the at least two different types of colour filters) are binned (namely, combined) together to form a single super photo-sensitive cell. Beneficially, this enables in reducing a noise in the peripheral region of the image (that is generated upon processing the image data), for example, due to averaging. Moreover, this may also facilitate in reducing an overall read out time of the image data from the image sensor, and in increasing a frame rate of displaying images. Even when binning is performed for the at least two photo-sensitive cells that correspond to the at least two different types of colour filters, the single super photo-sensitive cell would have a wide range spectral colour in the peripheral region, thereby potentially improving colour reproduction thereat. The at least two different types of colour filters may or may not comprise the at least one fourth type of colour filters. It will be appreciated that the aforesaid binning of the at least two photo-sensitive cells could be an analog binning i.e., binning that is performed at a time of reading out the image data from the image sensor. Binning process and its techniques/algorithms are well-known in the art.

Alternatively, optionally, the at least one first type of colour filters comprises a plurality of first type of colour filters, and wherein when reading out, the at least one processor is configured to bin at least two photo-sensitive cells having respective ones of the plurality of first type of colour filters in the peripheral region. In this regard, when reading out the image data from the peripheral region in the photo-sensitive surface, the at least two photo-sensitive cells (corresponding to a same type of a given colour filter) are binned together to form a single super photo-sensitive cell in the peripheral region. For example, the aforesaid binning could be performed for two or more photosensitive cells that have respective ones of different shades of a green colour filter. Beneficially, this enables in reducing a noise in the peripheral region of the image (that is generated upon processing the image data). Moreover, this may also facilitate in reducing an overall read out time of the image data from the image sensor, and in increasing a frame rate of displaying images.

Additionally or alternatively, optionally, the at least one second type of colour filters comprises a plurality of second type of colour filters, and wherein when reading out, the at least one processor is configured to bin at least two photo-sensitive cells having respective ones of the plurality of second type of colour filters in the peripheral region. Yet additionally or alternatively, optionally, the at least one third type of colour filters comprises a plurality of third type of colour filters, and wherein when reading out, the at least one processor is configured to bin at least two photo-sensitive cells having respective ones of the plurality of third type of colour filters in the peripheral region.

In an embodiment, when reading out, the at least one processor is configured to bin at least two photo-sensitive cells having a same type of colour filter in the gaze region. In this regard, since a visual quality (for example, in terms of colour reproduction, a resolution, a noise) in the gaze region of the image should be higher, as compared to the peripheral region of the image, it would be beneficial to bin the at least two photo-sensitive cells having the same type of colour filter, to form a single super photo-sensitive cell in the gaze region. This may, for example, be applicable in a scenario when a same colour spans across neighbouring photo-sensitive cells of a group. Beneficially, this enables in improving colour reproduction and in reducing a noise in the gaze region of the image (that is generated upon processing the image data). Moreover, this may also facilitate in reducing an overall read out time of the image data from the image sensor, and in increasing a frame rate of displaying images. It will be appreciated that a number of super photo-sensitive cells in the gaze region is greater than a number of super photo-sensitive cells in peripheral region. Optionally, a binning ratio in the gaze region is different from a binning ratio in the peripheral region. The term "binning ratio" refers to a number of photo-sensitive cells binned into a single photo-sensitive cell that is sampled/read out. In an example, the binning ratio towards an outer periphery of the peripheral region may be 16:1, 12:1, 9:1, 8:1, or similar, whereas the binning ratio towards an inner periphery of the peripheral region may be 6:1, 4:1, 2:1, or similar. The photo-sensitive cells that are binned could be arranged as a 2×1 grid, a 2×2 grid, a 3×2 grid, a 3×3 grid, a 4×3 grid, a 4×4 grid or similar.

In another embodiment, when reading out, the at least one processor is configured to individually read out the at least two photo-sensitive cells having the same type of colour filter in the gaze region. In such a case, scaling may be required to be performed, and thus no analog binning. Such a scaling is more like binning, but is a (digital) software process. Different weight factors could be applied to different photo-sensitive cells having the same type of colour filter, for example, based on which ones of these different photo-sensitive cells represent a salient feature (say, an edge, a corner, and the like). This may, particularly, be beneficial when any of: 4C Bayer CFA (also referred to as "quad" or "tetra", wherein a group of 2×2 pixels has a same colour), a 9C Bayer CFA (also referred to as "nona", wherein a group of 3×3 pixels has a same colour), a 16C Bayer CFA (also referred to as "hexadeca", wherein a group of 4×4 pixels has a same colour), is employed.

Optionally, when reading out, the at least one processor is configured to subsample the image data in the peripheral region. In this regard, the only some photo-sensitive cells (including those photo-sensitive cells that have the at least one fourth type of colour filters) are read out from at the peripheral region, instead of reading out each photo-sensitive cell from the peripheral region. Thus, when subsampling the image data (namely, selectively reading out the image data) in the peripheral region, image signals captured by only some photo-sensitive cells (including those photo-sensitive cells that have the at least one fourth type of colour filters) in the peripheral region are processed. In some implementations, an entirety of the peripheral region is subsampled. In other implementations, only a portion of the entirety of the peripheral region is subsampled. It will be appreciated that subsampling the image data in the peripheral region facilitates in providing a high frame rate of images. Subsampling is well-known in the art.

Optionally, the image data in a given region (namely, the gaze region and/or the peripheral region) is subsampled according to a subsampling pattern. The term "subsampling pattern" refers to a software-based masking pattern that enables in selectively reading out photo-sensitive cells from the image sensor. In this regard, photo-sensitive cells whose locations are indicated in the subsampling pattern as skipped are not read out from the image sensor (and thus image data for such photo-sensitive cells is not obtained), while photo-sensitive cells whose locations are indicated in the subsampling pattern as not skipped are read out from the image sensor (and thus image data for such photo-sensitive cells is obtained). Optionally, the subsampling pattern is a bit mask. As an example, in the subsampling pattern, '0' could indicate a photo-sensitive cell to be skipped and '1' could indicate a photo-sensitive cell to be read out. It will be appreciated that the subsampling pattern could be a non-regular pattern, wherein the non-regular pattern is a software-based masking pattern which indicates locations of irregularly-arranged (i.e., disorderly arranged) pixels in the image sensor that are to be read out. The subsampling pattern could alternatively be a random pattern, a gradient-type pattern, or a regular pattern. It will also be appreciated that the aforesaid subsampling could either be performed during reading out from the image sensor, or be performed prior to conversion of RAW image data into a given colour space format (for example, such as an RGB format, a Luminance and two-colour differences (YUV) format, or the like) in the ISP pipeline. Both of the aforesaid ways of subsampling are well-known in the art.

The present disclosure also relates to the method as described above.

Various embodiments and variants disclosed above, with respect to the aforementioned the imaging system, apply mutatis mutandis to the method.

Optionally, the method further comprises:
determining a peripheral region in at least one previous image that corresponds to the peripheral region in the photo-sensitive surface;
determining whether at least one image segment in the peripheral region in the at least one previous image has a colour whose wavelength lies in one of: the first wavelength range, the second wavelength range, the third wavelength range; and
when it is determined that at least one image segment in the peripheral region in the at least one previous image has a colour whose wavelength lies in one of: the first wavelength range, the second wavelength range, the third wavelength range, identifying a part of the peripheral region in the photo-sensitive surface that corresponds to the at least one image segment in the peripheral region in the at least one previous image,
wherein the step of reading out comprises selectively reading out the image data from those photo-sensitive cells in said part of the peripheral region that have one of: the at least one first type of colour filters, the at least one second type of colour filters, the at least one third type of colour filters, which corresponds to said one of: the first wavelength range, the second wavelength range, the third wavelength range, in which the wavelength of said colour lies.

In an embodiment, in the method, the step of reading out comprises selectively reading out the image data from photo-sensitive cells in the gaze region that have respective ones of: the at least one first type of colour filters, the at least one second type of colour filters and the at least one third type of colour filters.

In another embodiment, the method further comprises:
determining a gaze region in at least one previous image that corresponds to the gaze region in the photo-sensitive surface;
determining whether at least one image segment in the gaze region in the at least one previous image has a colour whose wavelength lies in one of: the first wavelength range, the second wavelength range, the third wavelength range; and
when it is determined that at least one image segment in the gaze region in the at least one previous image has a colour whose wavelength lies in one of: the first wavelength range, the second wavelength range, the third wavelength range, identifying a part of the gaze region in the photo-sensitive surface that corresponds to the at least one image segment in the gaze region in the at least one previous image, wherein the step of reading out comprises selectively reading out the image data from those photo-sensitive cells in said part of the gaze region that have one of: the at least one first type of colour filters, the at least one second type of colour filters, the at least one third type of colour filters, which corresponds to said one of: the first wavelength range, the second wavelength range, the third wavelength range, in which the wavelength of said colour lies.

In an embodiment, in the method, the step of reading out comprises binning at least two photo-sensitive cells having respective ones of at least two different types of colour filters in the peripheral region.

In another embodiment, in the method, the at least one first type of colour filters comprises a plurality of first type of colour filters, wherein the step of reading out comprises binning at least two photo-sensitive cells having respective ones of the plurality of first type of colour filters in the peripheral region.

Optionally, in the method, the step of reading out comprises binning at least two photo-sensitive cells having a same type of colour filter in the gaze region.

Optionally, in the method, the step of reading out comprises subsampling the image data in the peripheral region.

Detailed Description of the Drawings

Referring to FIG. 1, illustrated is a block diagram of an architecture of an imaging system 100 incorporating selective reading and skipping in colour filter arrays, in accordance with an embodiment of the present disclosure. The imaging system 100 comprises an image sensor 102 and at least one processor (for example, depicted as a processor 104). The image sensor 102 comprises a plurality of photo-sensitive cells 106 and a colour filter array 108. The processor 104 is communicably coupled to the image sensor 102. The processor 104 is configured to perform various operations, as described earlier with respect to the aforementioned first aspect.

It may be understood by a person skilled in the art that FIG. 1 includes a simplified architecture of the imaging system 100, for sake of clarity, which should not unduly limit the scope of the claims herein. It is to be understood that the specific implementation of the imaging system 100 is provided as an example and is not to be construed as limiting it to specific numbers or types of image sensors, processors, photo-sensitive cells, and colour filter arrays. The person skilled in the art will recognize many variations, alternatives, and modifications of embodiments of the present disclosure.

Figure 2:
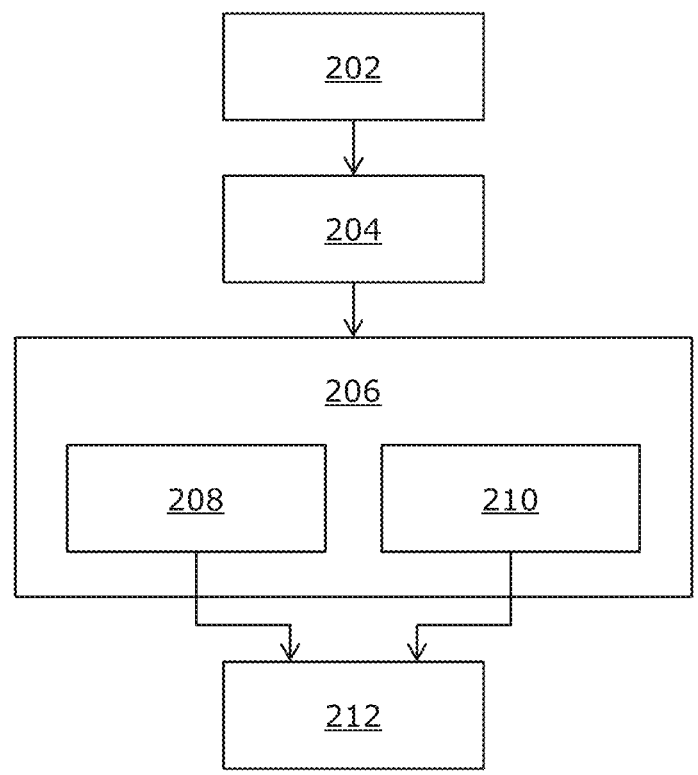
FIG. 2 illustrates steps of a method incorporating selective reading and skipping in colour filter arrays, in accordance with an embodiment of the present disclosure.

Referring to FIG. 2, illustrated are steps of a method incorporating selective reading and skipping in colour filter arrays, in accordance with an embodiment of the present disclosure. At step 202, information indicative of a gaze direction of a user is obtained. At step 204, a gaze region and a peripheral region in a photo-sensitive surface of an image sensor are determined, based on the gaze direction, wherein the image sensor comprises: a plurality of photo-sensitive cells arranged on the photo-sensitive surface of the image sensor; and a colour filter array comprising: at least one first type of colour filters that allow at least one first wavelength lying in a first wavelength range to pass through, at least one second type of colour filters that allow at least one second wavelength lying in a second wavelength range to pass through, at least one third type of colour filters that allow at least one third wavelength lying in a third wavelength range to pass through, and at least one fourth type of colour filters that allow the at least one first wavelength, the at least one second wavelength and the at least one third wavelength to pass through. At step 206, image data is read out from the image sensor.

Step 206 comprises steps 208 and 210. In this regard, at step 208, reading out of the image data from those photo-sensitive cells in the gaze region that have the at least one fourth type of colour filters is selectively skipped. Simultaneously, at step 210, the image data from those photo-sensitive cells in the peripheral region that have the at least one fourth type of colour filters, is selectively read out. At step 212, the image data is processed to generate an image.

The aforementioned steps are only illustrative and other alternatives can also be provided where one or more steps are added, one or more steps are removed, or one or more steps are provided in a different sequence without departing from the scope of the claims.

Figure 3A:
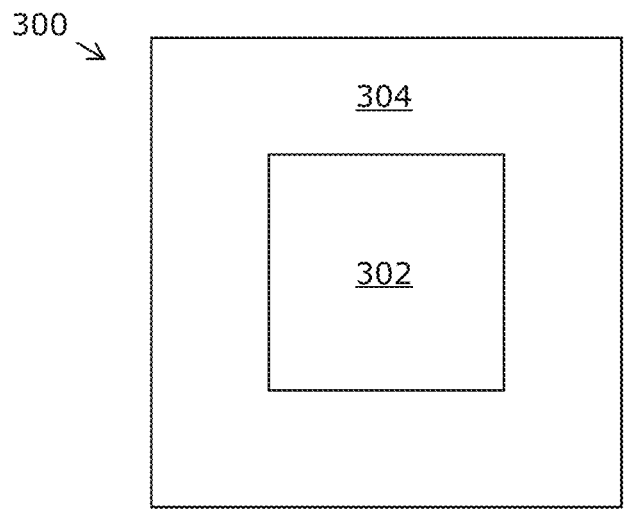
Figures 3B, 3C:
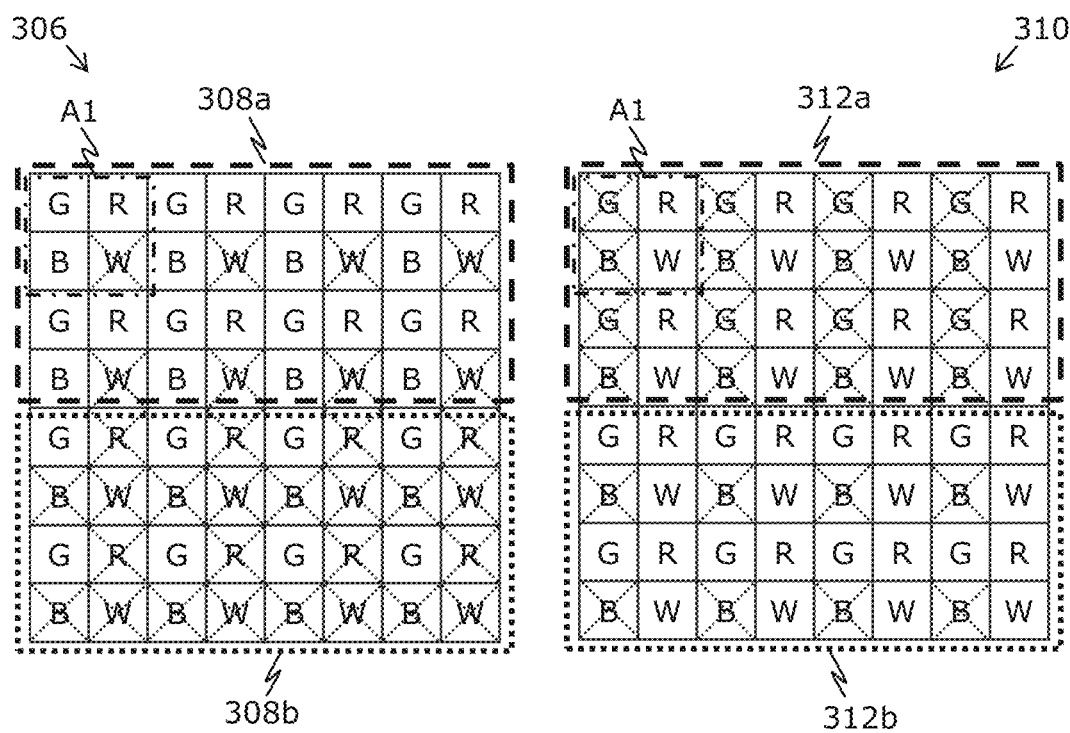
FIGS. 3B and 3C illustrate exemplary ways of reading out image data from the different regions of the photo-sensitive surface of the image sensor, in accordance with an embodiment of the present disclosure.

Referring to FIGS. 3A, 3B, and 3C, FIG. 3A illustrates different regions of a photo-sensitive surface 300 of an image sensor, while FIGS. 3B and 3C illustrate exemplary ways of reading out image data from the different regions of the photo-sensitive surface 300 of the image sensor, in accordance with an embodiment of the present disclosure. With reference to FIG. 3A, the photo-sensitive surface 300 of the image sensor comprises a gaze region 302 and a peripheral region 304, wherein the gaze region 302 surrounds the peripheral region 304. The gaze region 302 and the peripheral region 304 are determined (by at least one processor), based on a gaze direction of a user (for example, at a centre of the photo-sensitive surface 300).

In FIG. 3B, there is shown how the image data is read from a portion 306 of the gaze region 302. In FIG. 3C, there is shown how the image data is read from a portion 310 of the peripheral region 304. For sake of simplicity and clarity, a given portion of a given region is shown to comprise 64 photosensitive cells arranged in an 8×8 grid. The term "given portion" encompasses the portion 306 and/or the portion 310, and the term "given region" encompasses the gaze region 302 and/or the peripheral region 304. It will be appreciated that a photo-sensitive surface of a typical image sensor has millions of photosensitive cells (namely, pixels).

With reference to FIGS. 3B and 3C, the image sensor comprises a colour filter array (CFA) arranged in front of photosensitive cells of the photosensitive surface 300. The CFA comprises a smallest repeating 2×2 array A1 (depicted using a dash-dot line box) of colour filters having one first type of colour filter, one second type of colour filter, one third type of colour filter, and one fourth type of colour filter. The first type of colour filter (for example, a green colour filter, depicted using a letter "G") allows at least one first wavelength lying in a first wavelength range (for example, from 480 nanometres (nm) to 580 nm) to pass through. The second type of colour filter (for example, a red colour filter, depicted using a letter "R") allows at least one second wavelength lying in a second wavelength range (for example, from 400 nm to 480 nm) to pass through. The blue colour filter (for example, a blue colour filter, depicted using a letter "B") allows at least one third wavelength lying in a third wavelength range (for example, from 580 nm to 700 nm) to pass through. The fourth type of colour filter (for example, a white or near-white colour filter, depicted using a letter "W") allows the at least one first wavelength, the at least one second wavelength, and the at least one third wavelength (i.e., any wavelength(s) lying in a range of 400 nm to 700 nm) to pass through.

With reference to FIG. 3B, for an upper half 308a (depicted using a dashed line rectangle) of the portion 306 of the gaze region 302, out of 32 photo-sensitive cells, image data from 8 photo-sensitive cells (crossed out as dotted 'X's) that have the fourth type of colour filter is not read out (namely, skipped). Moreover, for the upper half 308a, image data from all remaining 24 photo-sensitive cells that have respective ones of: the first type of colour filter, the second type of colour filter, and the third type of colour filter, is read out (i.e., not skipped). Further, as an example, a lower half 308b (depicted using a dotted line rectangle) of the portion 306 of the gaze region 302 may correspond to an image segment in a portion of a gaze region in a previous image, wherein the image segment has a colour (i.e., a green colour) whose wavelength lies in the first wavelength range, and wherein the portion of the gaze region in the previous image corresponds to the portion 306 of the gaze region 302. In this regard, for the lower half 308b, out of 32 photo-sensitive cells, image data from 8 photo-sensitive cells that have the first type of colour filter is read out; and image data from all remaining 24 photo-sensitive cells (crossed out as dotted 'X's) that have respective ones of:

the second type of colour filter, the third type of colour filter, and the fourth type of colour filter, is not read out.

With reference to FIG. 3C, as an example, an upper half 312a (depicted using a dashed line rectangle) of the portion 310 of the peripheral region 304 may correspond to an image segment in a portion of a peripheral region in a previous image, wherein the image segment has a colour (i.e., a red colour) whose wavelength lies in the second wavelength range, and wherein the portion of the peripheral region in the previous image corresponds to the portion 310 of the peripheral region 304. In this regard, for the upper half 312a, out of 32 photo-sensitive cells, image data from 8 photo-sensitive cells that have the first type of colour filter, and image data from 8 photosensitive cells that have the fourth type of colour filter are read out. Moreover, image data from remaining 16 photo-sensitive cells (crossed out as dotted 'X's) that have respective ones of the first type of colour filter and the third type of colour filter, is not read out. Further, for a lower half 312b (depicted using a dotted line rectangle) of the portion 310 of the peripheral region 304, out of 32 photo-sensitive cells, image data from 8 photo-sensitive cells (crossed out as dotted 'X's) that have the third type of colour filter is not read out. Moreover, for the lower half 312b, image data from all remaining 24 photo-sensitive cells that have respective ones of: the first type of colour filter, the second type of colour filter, and the fourth type of colour filter, is read out.

Figure 4:
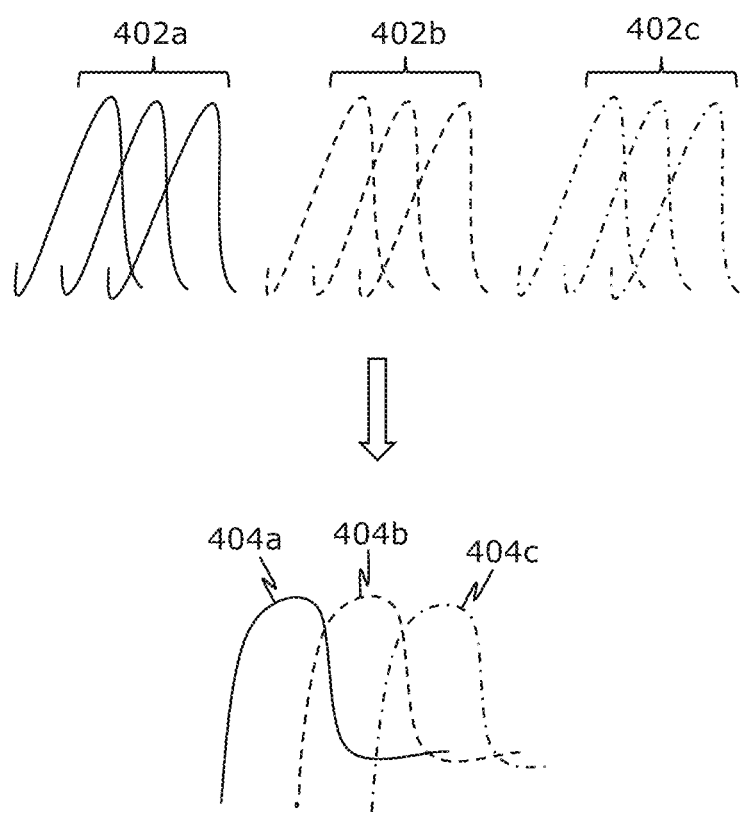
FIG. 4 illustrates an exemplary way of performing binning for different wavelengths corresponding to different types of colour filters of a colour filter array, in accordance with an embodiment of the present disclosure.

Referring to FIG. 4, illustrated is an exemplary way of performing binning for different wavelengths corresponding to different types of colour filters of a colour filter array, in accordance with an embodiment of the present disclosure. Herein, a first set of three wavelengths 402a (depicted using three solid line curves) that corresponds to a first type of colour filter (for example, a green colour filter) is binned to form a single wavelength 404a. Similarly, a second set of three wavelengths 402b (depicted using three dashed line curves) that corresponds to a second type of colour filter (for example, a red colour filter) is binned to form a single wavelength 404b. A third set of three wavelengths 402c (depicted using three dash-dot line curves) that corresponds to a third type of colour filter (for example, a blue colour filter) is binned to form a single wavelength 404c. Binning is well-known in the art.

FIGS. 3A, 3B, 3C, and 4 are merely examples, which should not unduly limit the scope of the claims herein. The person skilled in the art will recognize many variations, alternatives, and modifications of embodiments of the present disclosure.

The invention claimed is:

1. An imaging system comprising:
an image sensor comprising:
 a plurality of photo-sensitive cells arranged on a photo-sensitive surface of the image sensor; and
 a colour filter array comprising:
  at least one first type of colour filters that allow at least one first wavelength lying in a first wavelength range to pass through,
  at least one second type of colour filters that allow at least one second wavelength lying in a second wavelength range to pass through,
  at least one third type of colour filters that allow at least one third wavelength lying in a third wavelength range to pass through, and
  at least one fourth type of colour filters that allow the at least one first wavelength, the at least one second wavelength and the at least one third wavelength to pass through; and
at least one processor configured to:
 obtain information indicative of a gaze direction of a user;
 determine a gaze region and a peripheral region in the photo-sensitive surface of the image sensor, based on the gaze direction;
 read out image data from the image sensor, wherein when reading out, the at least one processor is configured to:
  selectively skip reading out the image data from those photo-sensitive cells in the gaze region that have the at least one fourth type of colour filters; and
  selectively read out the image data from those photo-sensitive cells in the peripheral region that have the at least one fourth type of colour filters; and
 process the image data to generate an image.

2. The imaging system of claim 1, wherein the at least one processor is configured to:
determine a peripheral region in at least one previous image that corresponds to the peripheral region in the photo-sensitive surface;
determine whether at least one image segment in the peripheral region in the at least one previous image has a colour whose wavelength lies in one of: the first wavelength range, the second wavelength range, the third wavelength range; and
when it is determined that at least one image segment in the peripheral region in the at least one previous image has a colour whose wavelength lies in one of: the first wavelength range, the second wavelength range, the third wavelength range, identify a part of the peripheral region in the photo-sensitive surface that corresponds to the at least one image segment in the peripheral region in the at least one previous image,
wherein when reading out, the at least one processor is configured to selectively read out the image data from those photo-sensitive cells in said part of the peripheral region that have one of: the at least one first type of colour filters, the at least one second type of colour filters, the at least one third type of colour filters, which corresponds to said one of: the first wavelength range, the second wavelength range, the third wavelength range, in which the wavelength of said colour lies.

3. The imaging system of claim 1, wherein when reading out, the at least one processor is configured to selectively read out the image data from photo-sensitive cells in the gaze region that have respective ones of: the at least one first type of colour filters, the at least one second type of colour filters and the at least one third type of colour filters.

4. The imaging system of claim 1, wherein the at least one processor is configured to:
determine a gaze region in at least one previous image that corresponds to the gaze region in the photo-sensitive surface;
determine whether at least one image segment in the gaze region in the at least one previous image has a colour whose wavelength lies in one of: the first wavelength range, the second wavelength range, the third wavelength range; and
when it is determined that at least one image segment in the gaze region in the at least one previous image has a colour whose wavelength lies in one of: the first wavelength range, the second wavelength range, the third wavelength range, identify a part of the gaze region in the photo-sensitive surface that corresponds to the at least one image segment in the gaze region in the at least one previous image,
wherein when reading out, the at least one processor is configured to selectively read out the image data from those photo-sensitive cells in said part of the gaze region that have one of: the at least one first type of colour filters, the at least one second type of colour filters, the at least one third type of colour filters, which corresponds to said one of: the first wavelength range, the second wavelength range, the third wavelength range, in which the wavelength of said colour lies.

5. The imaging system of claim 1, wherein when reading out, the at least one processor is configured to bin at least two photo-sensitive cells having respective ones of at least two different types of colour filters in the peripheral region.

6. The imaging system of claim 1, wherein the at least one first type of colour filters comprises a plurality of first type of colour filters, and wherein when reading out, the at least one processor is configured to bin at least two photo-sensitive cells having respective ones of the plurality of first type of colour filters in the peripheral region.

7. The imaging system of claim 1, wherein when reading out, the at least one processor is configured to bin at least two photo-sensitive cells having a same type of colour filter in the gaze region.

8. The imaging system of claim 1, wherein when reading out, the at least one processor is configured to subsample the image data in the peripheral region.

9. A method comprising:
obtaining information indicative of a gaze direction of a user;
determining a gaze region and a peripheral region in a photo-sensitive surface of an image sensor, based on the gaze direction, wherein the image sensor comprises a plurality of photo-sensitive cells arranged on the photo-sensitive surface of the image sensor, and a colour filter array comprising: at least one first type of colour filters that allow at least one first wavelength lying in a first wavelength range to pass through, at least one second type of colour filters that allow at least one second wavelength lying in a second wavelength range to pass through, at least one third type of colour filters that allow at least one third wavelength lying in a third wavelength range to pass through, and at least one fourth type of colour filters that allow the at least one first wavelength, the at least one second wavelength and the at least one third wavelength to pass through;
reading out image data from the image sensor, wherein the step of reading out the image data comprises:
selectively skip reading out the image data from those photo-sensitive cells in the gaze region that have the at least one fourth type of colour filters; and
selectively reading out the image data from those photo-sensitive cells in the peripheral region that have the at least one fourth type of colour filters; and
processing the image data to generate an image.

10. The method of claim 9, further comprising:
determining a peripheral region in at least one previous image that corresponds to the peripheral region in the photo-sensitive surface;
determining whether at least one image segment in the peripheral region in the at least one previous image has a colour whose wavelength lies in one of: the first wavelength range, the second wavelength range, the third wavelength range; and
when it is determined that at least one image segment in the peripheral region in the at least one previous image has a colour whose wavelength lies in one of: the first wavelength range, the second wavelength range, the third wavelength range, identifying a part of the peripheral region in the photo-sensitive surface that corresponds to the at least one image segment in the peripheral region in the at least one previous image,
wherein the step of reading out comprises selectively reading out the image data from those photo-sensitive cells in said part of the peripheral region that have one of: the at least one first type of colour filters, the at least one second type of colour filters, the at least one third type of colour filters, which corresponds to said one of: the first wavelength range, the second wavelength range, the third wavelength range, in which the wavelength of said colour lies.

11. The method of claim 9, wherein the step of reading out comprises selectively reading out the image data from photo-sensitive cells in the gaze region that have respective ones of: the at least one first type of colour filters, the at least one second type of colour filters and the at least one third type of colour filters.

12. The method of claim 9, further comprising:
determining a gaze region in at least one previous image that corresponds to the gaze region in the photo-sensitive surface;
determining whether at least one image segment in the gaze region in the at least one previous image has a colour whose wavelength lies in one of: the first wavelength range, the second wavelength range, the third wavelength range; and
when it is determined that at least one image segment in the gaze region in the at least one previous image has a colour whose wavelength lies in one of: the first wavelength range, the second wavelength range, the third wavelength range, identifying a part of the gaze region in the photo-sensitive surface that corresponds to the at least one image segment in the gaze region in the at least one previous image,
wherein the step of reading out comprises selectively reading out the image data from those photo-sensitive cells in said part of the gaze region that have one of: the at least one first type of colour filters, the at least one second type of colour filters, the at least one third type of colour filters, which corresponds to said one of: the first wavelength range, the second wavelength range, the third wavelength range, in which the wavelength of said colour lies.

13. The method of claim 9, wherein the step of reading out comprises binning at least two photo-sensitive cells having respective ones of at least two different types of colour filters in the peripheral region.

14. The method of claim 9, wherein the at least one first type of colour filters comprises a plurality of first type of colour filters, and wherein the step of reading out comprises binning at least two photo-sensitive cells having respective ones of the plurality of first type of colour filters in the peripheral region.

15. The method of claim 9, wherein the step of reading out comprises binning at least two photo-sensitive cells having a same type of colour filter in the gaze region.

\* \* \* \* \*